Oct. 16, 1928.
H. W. CLARK
DRIER
Filed May 18, 1927
1,687,829
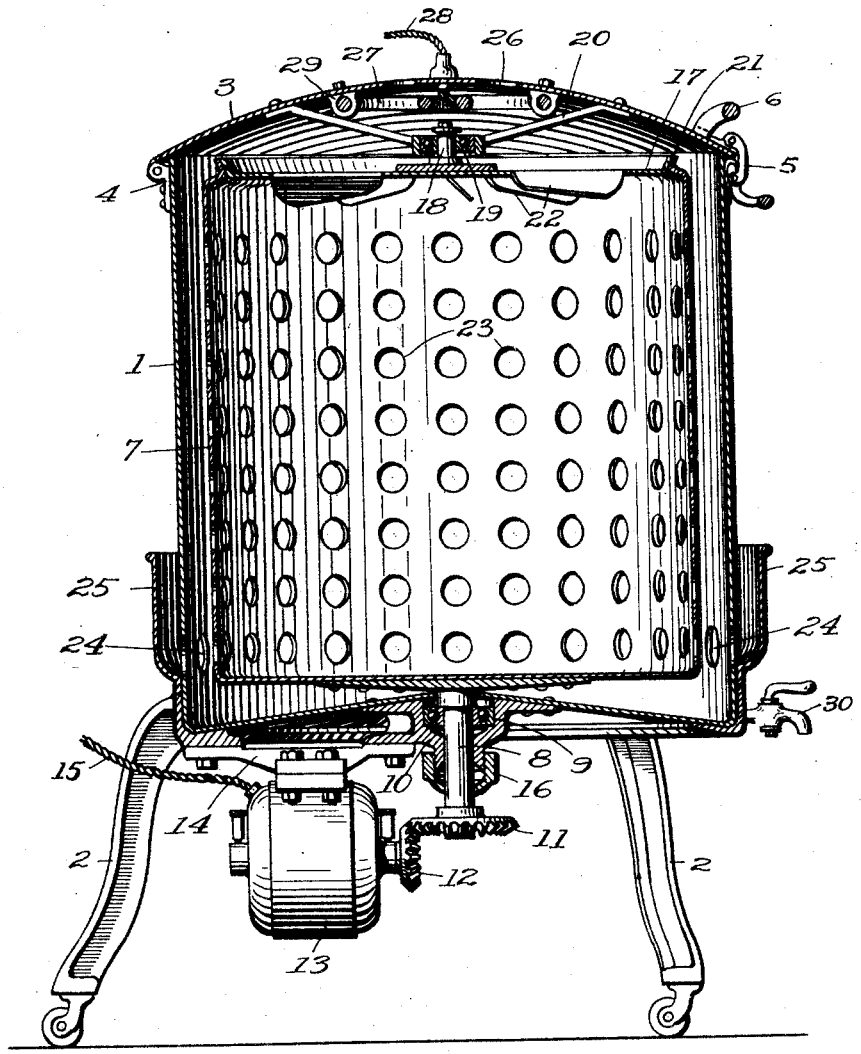
Inventor
Henry W. Clark
Atty.

Patented Oct. 16, 1928.

1,687,829

UNITED STATES PATENT OFFICE.

HENRY W. CLARK, OF DANVILLE, ILLINOIS.

DRIER.

Application filed May 18, 1927. Serial No. 192,400.

My invention relates particularly to machines designed for family use, though it is capable of advantageous use for other purposes.

One object of my invention is to provide a machine which may be used as a centrifugal extractor and in connection with such use, may also serve as an aerator and drier to remove practically all of the moisture from the clothes.

Another object of my invention is to provide a heating element arranged in the passage of a current of air, which current is established by a portion of the device and directed so that it passes through the clothes in the machine to assist in the drying process.

Another object of my invention is to provide a portion of the rotating part of the machine with fan blades to cause a movement of air through it and to properly direct the movement of air.

Other objects of my invention will appear and be described in the specification.

The novelty of my invention will be hereinafter more fully set forth and specifically pointed out in the claims.

In the accompanying drawing I have shown a sectional side elevation of a device embodying my invention.

As showing one form of device which embodies my invention, though without limiting myself to the details of construction or arrangement of parts shown and to be herein described, but availing myself of all changes and modifications which may be made and which fall within the scope of the appended claims, I have shown a machine consisting of an outer receptacle 1, supported by suitable legs 2 and provided with a cover 3 hinged to the receptacle as at 4, and provided with a latch mechanism 5 to hold it in closed position, a handle 6 being provided to raise the cover when the latch 5 is disengaged. A perforated container 7 is mounted within the receptacle 1 and is provided with a shaft 8 which is preferably mounted on an anti-friction bearing 9 and extends downwardly through a suitable housing 10 carried by the bottom of the receptacle 1, the shaft 8 carrying near its lower end, a bevel gear 11 which is driven by a pinion 12 mounted on the shaft of a suitable motor 13, the latter being mounted on a bracket 14 extending from the housing 10 to the ring which forms the upper portion of the legs 2, the motor 13 being supplied with energy through the leads 15. A stuffing box 16 is carried by the housing 10 and serves to prevent the escape of any liquid at the point where the shaft 8 passes through the bottom of the receptacle 1.

The container 7 is provided with a cover 17, the latter being provided with a stub shaft 18 which passes through a suitable anti-friction bearing 19, the latter being mounted in a spider 20 carried by the cover 3, the joint between the cover 17 and the container 7 being preferably conical as shown at 21 so that when the cover 3 is moved to closed position, the cover 17 properly engages the upper portion of the container 7, it being noted that the stub shaft 18 allows a slight amount of vertical play so that the cover 17 can find its seat at the conical joint 21.

The cover 17 is cut at a number of places and portions of it bent downwardly at an angle to form fan blades 22 which, when the container 7 is rotated, acts as a fan to force air downwardly into the container, the air escaping from the container through the perforations 23 into the space between the container 7 and the receptacle 1, the air passing out of the receptacle 1 through a series of openings 24 arranged in the receptacle and preferably enclosed by a shield 25 which may extend upwardly to any extent desired.

A series of openings 26 is formed through the cover 3 and immediately below these openings a heating element 27 is mounted, this element being supplied with current by the lead 28. Any suitable grid type of heating element which will permit a free flow of air through it may be used, the heating element being preferably mounted on the cover 3 by a series of insulators 29, it being obvious that the heating element may be of any usual or suitable type for the purpose.

Any suitable drain cock or valve 30 may be provided at the bottom of the receptacle 1, through which any accumulation of fluid may be drawn.

The operation of the device is as follows, assuming that the leads 15 and 28 are connected to suitable sources of current supply. The operator first disengages the latch 5 and raises the cover 3 which carries with it the cover 17, and charges the container 7 with the material or clothes to be dried, after which he closes the cover 3 and turns on the current to both the heater and the motor, thus setting the container in rotation and providing a supply of heated air which will be drawn through the openings 26 in the cover 3 and through the openings in the cover 17 by the fan blades 22, the downward movement of the heated air and the centrifugal force set up by the rotation of the container 7 forcing the air out through the openings 23 in the side walls of the container into the space between the container 7 and the receptacle 1, from which the air will pass through the openings 24 and escape through the shield 25.

Should there be any accumulation of water or other fluid, this may be drawn off through the valve 30.

After the contents of the container 7 have been dried to the extent desired, the current is shut off from the motor and the heater, and when the container comes to rest, the cover 3 is raised and the container unloaded and recharged if desired.

If the clothes or other material placed in the machine are in a very wet condition, the valve 30 may be left open and as fast as there is any accumulation, it will pass out of the machine through this valve.

It is obvious that the shield 25 may be extended upwardly as far as desired so that the machine, with the addition of a suitable driving mechanism which will impart a comparatively slow intermittent rotation to the container, may be used as a washing machine. In the latter case, after the washing operation is completed, the valve 30 may be opened to withdraw the water and the heater turned on and the machine connected as by the gearing shown in the drawing to impart a relatively high rotating speed to the container, for the drying operation.

The rinsing operation may be conducted by closing the valve 30, and partially filling the machine with rinse water, then engaging the suitable gear for washing and continuing the operation until the end of the rinsing operation after which the primary function of the machine may be employed, namely, that of drying the contents of the container 7 as previously described.

The gearing and other details incident to equipping the machine to serve as a washing machine are well known in the art and it has not been thought necessary to illustrate them.

Having thus fully described my invention, I claim:

1. In a drier the combination of a rotatable perforated container, means for rotating the container, a heating element adjacent the container, and a cover for the container and comprising in part a fan for producing a flow of heated air from the heating element to the interior of the container.

2. In a drier the combination of a receptacle, a rotatable perforated container within the receptacle, means for rotating the container, a cover for the receptacle, a cover for the container, a heating element carried by the cover for the receptacle, and a fan carried by the cover of the container for moving heated air from the heating element to the interior of the container.

3. In a drier the combination of a receptacle, a rotatable perforated container mounted in the receptacle, means for rotating the container, a perforated cover for the receptacle, a heating element arranged adjacent the perforations in the cover, a perforated cover for the container and carrying fan blades adjacent the perforations for moving heated air from the heater to the interior of the container, and an air outlet passage from the receptacle.

HENRY W. CLARK.